(12) United States Patent
Schicht et al.

(10) Patent No.: US 7,153,595 B2
(45) Date of Patent: Dec. 26, 2006

(54) TRANSPARENT SUBSTRATE HAVING A STACK OF THIN METALLIC REFLECTION LAYERS

(75) Inventors: Heinz Schicht, Bethau (DE); Herbert Schindler, Torgau (DE); Uwe Schmidt, Falkenberg (DE); Axel Marold, Suptitz (DE)

(73) Assignee: Saint-Gobain Glass France, Courbevoie (FR)

( * ) Notice: Subject to any disclaimer, the term of this patent is extended or adjusted under 35 U.S.C. 154(b) by 195 days.

(21) Appl. No.: 10/416,206

(22) PCT Filed: Nov. 21, 2001

(86) PCT No.: PCT/FR01/03657

§ 371 (c)(1),
(2), (4) Date: Oct. 1, 2003

(87) PCT Pub. No.: WO02/42234

PCT Pub. Date: May 30, 2002

(65) Prior Publication Data

US 2004/0053068 A1    Mar. 18, 2004

(30) Foreign Application Priority Data

Nov. 25, 2000  (DE) ................................ 100 58 700

(51) Int. Cl.
*B32B 17/06* (2006.01)

(52) U.S. Cl. ...................... 428/701; 428/689; 428/699

(58) Field of Classification Search ................ 428/216, 428/334, 336, 426, 432, 433, 457, 702, 701, 428/698, 699, 215, 472; 359/589, 359, 360, 359/361, 580, 585, 586
See application file for complete search history.

(56) References Cited

U.S. PATENT DOCUMENTS

| 4,335,961 A | * | 6/1982 | Chou et al. .................. 356/517 |
| 4,900,630 A | | 2/1990 | Suzuki et al. ............... 428/432 |
| 5,085,926 A | | 2/1992 | Iida et al. .................... 428/216 |
| 5,298,048 A | | 3/1994 | Lingle et al. ................ 65/60.2 |
| 5,346,770 A | * | 9/1994 | Osada et al. ................ 428/432 |
| 5,543,229 A | * | 8/1996 | Ohsaki et al. ............... 428/432 |
| 5,688,585 A | * | 11/1997 | Lingle et al. ............... 428/216 |
| 6,045,864 A | * | 4/2000 | Lyons et al. ........... 427/255.23 |

FOREIGN PATENT DOCUMENTS

| EP | 0 436 045 B1 | 7/1991 |
| EP | 4 900 630 | 12/1992 |
| EP | 0 779 225 | 6/1997 |

OTHER PUBLICATIONS (CRC Handbook of Chemistry and Physics 61st edition 1980-1981 pp. B-93, B159-160 and B166).*

* cited by examiner

*Primary Examiner*—Jennifer C. McNeil
*Assistant Examiner*—Elizabeth D. Ivey
(74) *Attorney, Agent, or Firm*—Oblon, Spivak, McClelland, Maier & Neustadt, P.C.

(57) ABSTRACT

A glass pane is provided with a multilayer system having metallic reflection and a high thermal resistance. The multilayer system comprises a dielectric base layer, a metal layer having a high reflection, made of chromium or a metal alloy containing at least 45 wt % chromium, and a nitride top layer. The dielectric base layer is composed of at least one oxide partial layer made of $SnO_2$, $ZnO$ and/or $TiO_2$, close to the surface of the glass, and a nitride partial layer, close to the metal layer.

28 Claims, No Drawings

TRANSPARENT SUBSTRATE HAVING A STACK OF THIN METALLIC REFLECTION LAYERS

FIELD OF THE INVENTION

The invention relates to a transparent substrate having a multilayer coating comprising thin layers for metallic reflection and for high thermal resistance, these substrates are in particular suitable for being heat-treated (bending, toughening, annealing), without the appearance and the optical properties of the layers being significantly impaired. The multilayer coating comprises a dielectric base layer, a metal layer having a high reflection, made of chromium or a metal alloy containing at least 45 wt % chromium and a dielectric nitride covering layer. However, the invention also relates to a glazing" in which the substrate carrying the multilayer coating is transparent but not made of glass, especially a rigid polyethylene terephthalate (PET_type, therefore based on organic polymers.

BACKGROUND OF THE INVENTION

Substrates coated in this way, having a high metallic reflection and a relatively low light transmission, are very decorative. In architecture they are often used for dressing walls, or curtain walling (glazing panels or facing tiles), as mirror elements, as semitransparent mirrors or as decorative glass sheets. They may also be provided with an additional decorative glass sheets. They may also be provided with an additional decorative printing and/or may also be used, where appropriate, in curved or deformed form. If they are used as monolithic glass panes, the surface layer is exposed, to the atmosphere in such a way that it must have a particularly high capacity to resist atmospheric effects. For safety reasons and/or for the purpose of increasing their flexural strength and their impact strength, the coated glass substrates intended for these applications are often thermally prestressed, that is to say heated to a temperature above 500° C., 550° C. or 600° C., and then very rapidly cooled. The reflecting multilayer coating comprising thin layers must also withstand this thermal stressing without being damaged, the properties, in particular the esthetic, optical, thermal and energy properties, of the coated glass glazing having not to be disturbed thereby.

A glass pane with a high thermal resistance is known, from document EP 0 962 429 A1, which has a multilayer coating of the kind mentioned at the beginning and which meets these requirements. In the case of this known multilayer coating, the dielectric base layer is composed of $SiO_2$, $Al_2O_3$, SiON, $Si_3N_4$ or AlN, or else a mixture of at least two of these materials. All these materials can be applied to the glass pane only with a relatively low sputtering rate and/or only with a relatively high technological effort being supplied. Because industrial coating plants operate, for economic reasons, at run speeds as high as possible, the base layer can be applied, in the case of standard plants, only with a relatively small thickness. However, a larger thickness of the base layer may be desirable as an interference layer to modify the appearance in light reflection (color and intensity of the color) of the glass pane, both in terms of light reflection on the glass side and in terms of light transmission.

A multilayer coating capable of being curved and/or stressed beforehand, having a chromium layer as reflection layer, is also known from the document EP 0 436 045 A1. In this case, however, the covering layer is composed of an alloy of Al with Ti and/or Zr. Thanks to a top layer of this kind, the high reflectivity of the chromium layer on the layer side is lost and the reflection on the glass side reaches a maximum value of 50%. The base layer in this case is composed of $TiO_2$, $Ta_2O_5$, $ZrO_2$ or $SiO_2$. Admittedly, the base layer must, in this case, be able to be deposited with a thickness such that it acts as a color-modifying interference layer, the increase in the layer thickness being, however, limited for these materials for technological and economic reasons.

Document EP 0 536 607 B1 describes coated glass panes with a metallic appearance, the transparent coatings of which are also suitable for a heat treatment. In this case however, the layer having metallic properties is composed of a metal compound, namely a metal boride, a metal carbide, a metal nitride or a metal oxinitride. These metal compounds do not possess the same gloss in light reflection as purely metal layers. Deposited on this layer is a protective metal layer, for example made of chromium, which is oxidized during the heat treatment. The multilayer coatings described in this publication are, firstly, coatings with a high transparency and the use of metallic reflection on both sides of the glass panes for decorative reasons plays no role in the case of these multilayer coatings.

It is desirable to ensure that the impression of color of the light reflected by interferential action of the base layer is adjustable in a targeted manner, without it being necessary in this case to perform technological feats or to reduce the run speed of the glass pane in a coating plant working continuously. A multilayer coating of this kind should have a high corrosion (mechanical, chemical) resistance and a high hardness and should maintain, after a heat-treatment process of the bending, toughening or annealing type, its properties, in particular a high light reflection, to be essentially neutral in color on the layer side and to have a transmission lying within the range between 2 and 15%.

SUMMARY OF THE INVENTION

The object of the invention is to provide an improved multilayer coating of the kind mentioned at the beginning, having a high metallic reflection on both sides of the glass panes thus coated.

DETAILED DESCRIPTION OF THE INVENTION

This objective is achieved according to the invention thanks to the features described herein. The secondary claims provide advantageous improvements to the subject matter of the present invention.

The dielectric base layer is consequently composed of at least one oxide partial layer, close to the surface of the glass, having a reflective index $\geq 2.0$, and of a nitride partial layer which may or may not be contiguous with the metal layer.

A base layer simply based on an oxide easily sputterable by sputtering has not proven itself because it turns out, that in this case, the chromium metal layer undergoes a color modification during the heat treatment and is even destroyed. This risk is completely eliminated by the formation of multiple layers according to the invention of the base layer, during which a thin partial layer made of a metal nitride is placed immediately beneath the metal layer. Thanks to the second partial layer being placed so as to be contiguous with the surface of the glass and based on a metal oxide easily sputterable by sputtering, having a reflective index of at least 2.0, the thermal resistance of the multilayer coating is not disturbed. The appearance in light reflection (color and color intensity) of the reflected light may be modified in a simple manner within wide ranges. The run speed of the glass panes through the coating plant must, however, not be substantially reduced. Oxide partial layers of this kind may be deposited without any problem with a thickness ranging up to 90 nm, so that there is considerable play with regard to the appearance in light reflection that may be obtained.

As an improvement of the invention, the nitride partial layer of the dielectric base layer is composed of $Si_3N_4$ and/or AlN (which optionally may contain minority elements (Al, boron etc.) which are dopants of the targets) and has a layer of at least 10 nm. The oxide partial layer or layers of the dielectric base layer is (are) preferably based on $SnO_2$ and/or ZnO and/or $TiO_2$ and/or $Nb_2O_5$ and/or $ZnO_2$ and has (have) a thickness ranging from 30 to 90 nm.

A particularly high gloss of the coated glass panes is obtained by using pure chromium for the metal layer having a high reflection. Thanks to pure chromium layers, it is possible to achieve degrees of reflection in the visible range of the spectrum ranging up to 60%. However, CrAl alloys containing 75–80 wt % Cr, CrSi alloys containing 45–85 wt % Cr and CrAlSi alloys containing 70–80 wt % Cr are also appropriate as chromium-containing metal alloys.

By way of example, the following operating methods can be used to obtain the metal oxide layers and the nitride layers:
  if the deposition is reactive, by using a suboxidized metal target (in the case of metal layers), by using an Si metal target (possibly doped with Al or boron) or using a subnitrided target (in the case of nitride layers);
  if the deposition is nonreactive, ceramic targets may be used (in the case of metal layers) or by using a nitrided target (in the case of nitride layers).

In an advantageous improvement of the invention, a 1 to 3 nm thick protective layer made of a metal or a metal alloy, such as Zr, Ti, TiCr, ZrCr or TiNi, is placed on the nitride covering layer of the multilayer coating. This protective metal layer is converted, during the heat treatment, so as to form a corresponding oxide layer.

The multilayer coatings according to the invention can be applied to the glass panes as integral layers adhering to one another over their entire area. Particularly esthetic effects can be obtained when the reflecting multilayer coating is applied to the surface of the glass as a discontinuous layer in the form of a decoration or pattern, or if patterns or decorations made, for example, of a color to be baked are printed on that side of the glass pane which has been coated. The color to be baked may be annealed after the heat-treatment process.

Further advantages and details of the invention will become apparent from the description which follows of three examples of the invention, to be compared with two comparative examples according to the prior art.

As tests intended to evaluate the corrosion resistance of the multilayer coating, the following were carried out: the "salt fog" test in accordance with the ISO 9227 standard, the "$SO_2$" test in accordance with the DIN 50018 standard, the "Taber abrasion" test in accordance with the DIN EN 1096-1;-2 standard, the "sweat" test in accordance with the DIN 50017 standard and the "Cass" test in accordance with the ISO 9227 standard. Measurements of the transmission $T_{vis}$ and the reflection $R_{vis}$, in the visible range of the spectrum, and the color coordinates a* and b*, for the purpose of determining the color in reflection, were carried out in accordance with the DIN 5033 standard.

COMPARATIVE EXAMPLE 1

Panes of flute glass, 6 mm in thickness, having the surface dimensions of 6×3.21 $m^2$, were coated in an industrial sputtering plant according to the process of magnetically enhanced sputtering, with the multilayer coating comprising: glass/10 nm of $SiO_2$/35 nm of Cr/6 nm of $Si_3N_4$. Specimens taken over the width of the glass panes gave the following reflection values $R_{vis}$ and transmission values $T_{vis}$:

| $R_{vis}$: | |
|---|---|
| coating side | 57.0% |
| glass side | 48.7% |
| $T_{vis}$: | 2.5% |
| Color in reflection (laboratory system): | |
| coating side | a* = −0.36 |
| | b* = 1.43 |
| glass side | a* = −0.53 |
| | b* = 0.32. |

The colors in reflection on the glass side and on the multilayer coating side are almost identical, the multilayer coating side having, however, a slight yellowish coloration, as always evinced by the positive b* value of 1.43.

The tests relating to the corrosion resistance and to the hardness of the multilayer coating gave the following results:

| Salt fog test: | passed |
|---|---|
| $SO_2$ test: | passed |
| Taber abrasion test: | passed |
| Sweat test: | passed |
| Cass test: | passed. |

COMPARATIVE EXAMPLE 2

Attempts were made to coat the glass panes with the same multilayer coating in the same sputtering plant as that used in the case of Comparative Example 1, with however a base layer having a thickness such that the color in reflection on the glass side was blue. For this purpose, it was necessary to apply the $SiO_2$ base layer with a thickness of 100 nm. Despite the use of special Si cathodes, it was possible to manufacture the 100 nm thick base layer only with a substantially reduced run speed of the glass pane.

Measurement of the optical properties gave the following values:

| $R_{vis}$: | |
|---|---|
| coating side | 57.3% |
| glass side | 28.3% |
| $T_{vis}$: | 3.0% |
| Color in reflection (laboratory system): | |
| coating side | a* = −0.5 |
| | b* = +1.5 |
| glass side | a* = −1.1 |
| | b* = −8.3. |

Compared with Comparative Example 1, there was a substantial decrease in the reflection on the glass side.

Furthermore, the productivity was considerably reduced during coating. However, all the corrosion and hardness tests were passed without any problem, as in the case of Comparative Example 1.

ILLUSTRATIVE EXAMPLE 1 OF THE INVENTION

The following multilayer coating according to the invention: glass/58 nm of $SnO_2$/17 nm of $Si_3N_4$/35 nm of Cr/6 nm of $Si_3N_4$/2 nm of Zr was produced on the same large sputtering plant. Various specimens were extracted from the coated glass pane over the width of the pane. The specimens were subjected to a heat treatment. Measurement of the optical properties on the prestressed specimens gave the following results:

| $R_{vis}$: | |
|---|---|
| coating side | 57.4% |
| glass side | 30.0% |
| $T_{vis}$: | 3.5% |
| Color in reflection (laboratory system): | |
| coating side | a* = 0.13 |
|  | b* = 4.03 |
| glass side | a* = −0.01 |
|  | b* = −0.96. |

All the corrosion and hardness tests were passed without any problem. The color in reflection on the glass side was neutral and the multilayer coating side had a particularly high reflection with a bright yellow and pleasing tint.

EXAMPLE 2 OF THE INVENTION

The following multilayer coating according to the invention: glass/42 nm of $SnO_2$/8 nm of ZnO/17 nm of $Si_3N_4$/17 nm of Cr/18.5 nm of $Si_3N_4$/2 nm of Zr was produced in the same cycle of tests, under identical test conditions moreover. The following optical properties were determined:

| $R_{vis}$: | |
|---|---|
| coating side | 38.4% |
| glass side | 19.0% |
| $T_{vis}$: | 14.0% |
| Color in reflection (laboratory system): | |
| $T_{vis}$: | |
| coating side | a* = −0.39 |
|  | b* = 16.8 |
| glass pane side | a* = −0.86 |
|  | b* = −11.6. |

All the corrosion and hardness tests were passed without any problem. On the glass side, the color in reflection was an intense blue, whereas on the multilayer coating side the color was yellow. A pane element of this kind can be used as a semitransparent mirror, for example as an integral glass door, one side appearing blue in reflection and the other side appearing yellow.

EXAMPLE 3 OF THE INVENTION

The following multilayer coating according to the invention: glass/56 nm of $SnO_2$/34 nm of $Si_3N_4$/35 nm of Cr/6 nm of $Si_3N_4$/2 nm of Zr was produced in the large sputtering plant, under the identical test conditions moreover, and the properties of the layers were determined.

Determination of the optical properties gave the following values:

| $R_{vis}$: | |
|---|---|
| coating side | 55.5% |
| glass side | 39.5% |
| $T_{vis}$: | 2.5% |
| Color in reflection (laboratory system): | |
| coating side | a* = 0.13 |
|  | b* = 3.98 |
| glass side | a* = −6.53 |
|  | b* = −2.0. |

All the corrosion and hardness tests were passed without any problem. The glass element appeared in reflection, on the glass side, green-blue and, on the multilayer coating side, it had a high reflection with a yellowish tint. A glass element of this kind can be used, for example, with the glass side facing the outside, as a curtain walling element, the multilayer coating side having in this case to fulfill no decorative function.

The invention claimed is:

1. A transparent pane having a transmission of visible light of between 2% and 15%, comprising:
   a substrate and a multilayer coating,
   wherein said multilayer coating comprises
   (i) a dielectric base layer comprising at least one oxide partial layer having a reflective index of 2 or greater and a nitride partial layer,
   (ii) a metal layer comprising a chromium alloy containing at least 45 weight percent chromium, wherein the metal layer is contiguous with the nitride partial layer; and
   (iii) a dielectric nitride covering layer,
   wherein the chromium alloy is selected from the group consisting of a CrAl alloy containing from 75 to 80 weight percent chromium, a CrSi alloy containing from 45 to 85 weight percent chromium, and a CrSiAl alloy containing from 70 to 80 weight percent chromium.

2. The transparent pane of claim 1, wherein the at least one oxide partial layer is contiguous with the substrate.

3. The transparent pane of claim 1, wherein the at least one oxide partial layer is not contiguous with the substrate.

4. The transparent pane of claim 1, wherein the dielectric base layer comprises $SnO_2$, ZnO, $TiO_2$, and mixtures thereof.

5. The transparent pane of claim 1, wherein the dielectric base layer has a thickness ranging from 30 nm to 90 nm.

6. The transparent pane of claim 1, wherein the nitride partial layer has a thickness of at least 10 nm.

7. The transparent pane of claim 1, wherein the metal layer has a thickness ranging from 15 nm to 50 nm.

8. The transparent pane of claim 1, further comprising a metal or metal alloy protective layer that can be converted after heat treatment into an oxide layer, wherein the protective layer is in contact with dielectric nitride covering layer.

9. The transparent pane of claim 8, wherein the protective layer is selected from the group consisting of Zr, Ti, TiCr, ZrCr, TiNi, and mixtures thereof.

10. The transparent pane of claim 8, wherein the protective layer has a thickness ranging from 1 nm to 3 nm.

11. The transparent pane of claim 1, wherein the dielectric nitride covering layer comprises $Si_3N_4$, AlN, or a mixture thereof.

12. The transparent pane of claim 11, wherein the dielectric nitride covering layer has a thickness ranging from 1 nm to 3 nm.

13. The transparent pane of claim 1, wherein the multilayer coating is a continuous coating.

14. The transparent pane of claim 1, wherein the multilayer coating is a discontinuous coating.

15. A transparent pane having a minimum reflectance of visible light of at least 30%, comprising:
   a substrate and a multilayer coating,
   wherein said multilayer coating comprises
   (i) a dielectric base layer comprising at least one oxide partial layer having a reflective index of 2 or greater and a nitride partial layer,
   (ii) a metal layer comprising a chromium alloy containing at least 45 weight percent chromium, wherein the metal layer is contiguous with the nitride partial layer; and
   (iii) a dielectric nitride covering layer,
   wherein the chromium alloy is selected from the group consisting of a CrAl alloy containing from 75 to 80 weight percent chromium, a CrSi alloy containing from 45 to 85 weight percent chromium, and a CrSiAl alloy containing from 70 to 80 weight percent chromium.

16. The transparent pane of claim 15, wherein the at least one oxide partial layer is contiguous with the substrate.

17. The transparent pane of claim 15, wherein the at least one oxide partial layer is not contiguous with the substrate.

18. The transparent pane of claim 15, wherein the dielectric base layer comprises $SnO_2$, ZnO, $TiO_2$, and mixtures thereof.

19. The transparent pane of claim 15, wherein the dielectric base layer has a thickness ranging from 30 nm to 90 nm.

20. The transparent pane of claim 15, wherein the nitride partial layer has a thickness of at least 10 nm.

21. The transparent pane of claim 15, wherein the metal layer has a thickness ranging from 15 nm to 50 nm.

22. The transparent pane of claim 15, further comprising a metal or metal alloy protective layer that can be converted after heat treatment into an oxide layer, wherein the protective layer is in contact with dielectric nitride covering layer.

23. The transparent pane of claim 15, wherein the protective layer is selected from the group consisting of Zr, Ti, TiCr, ZrCr, TiNi, and mixtures thereof.

24. The transparent pane of claim 15, wherein the protective layer has a thickness ranging from 1 nm to 3 nm.

25. The transparent pane of claim 15, wherein the dielectric nitride covering layer comprises $Si_3N_4$, AlN, or a mixture thereof.

26. The transparent pane of claim 25, wherein the dielectric nitride covering layer has a thickness ranging from 1 nm to 3 nm.

27. The transparent pane of claim 15, wherein the multilayer coating is a continuous coating.

28. The transparent pane of claim 15, wherein the multilayer coating is a discontinuous coating.

* * * * *